United States Patent Office 3,838,189
Patented Sept. 24, 1974

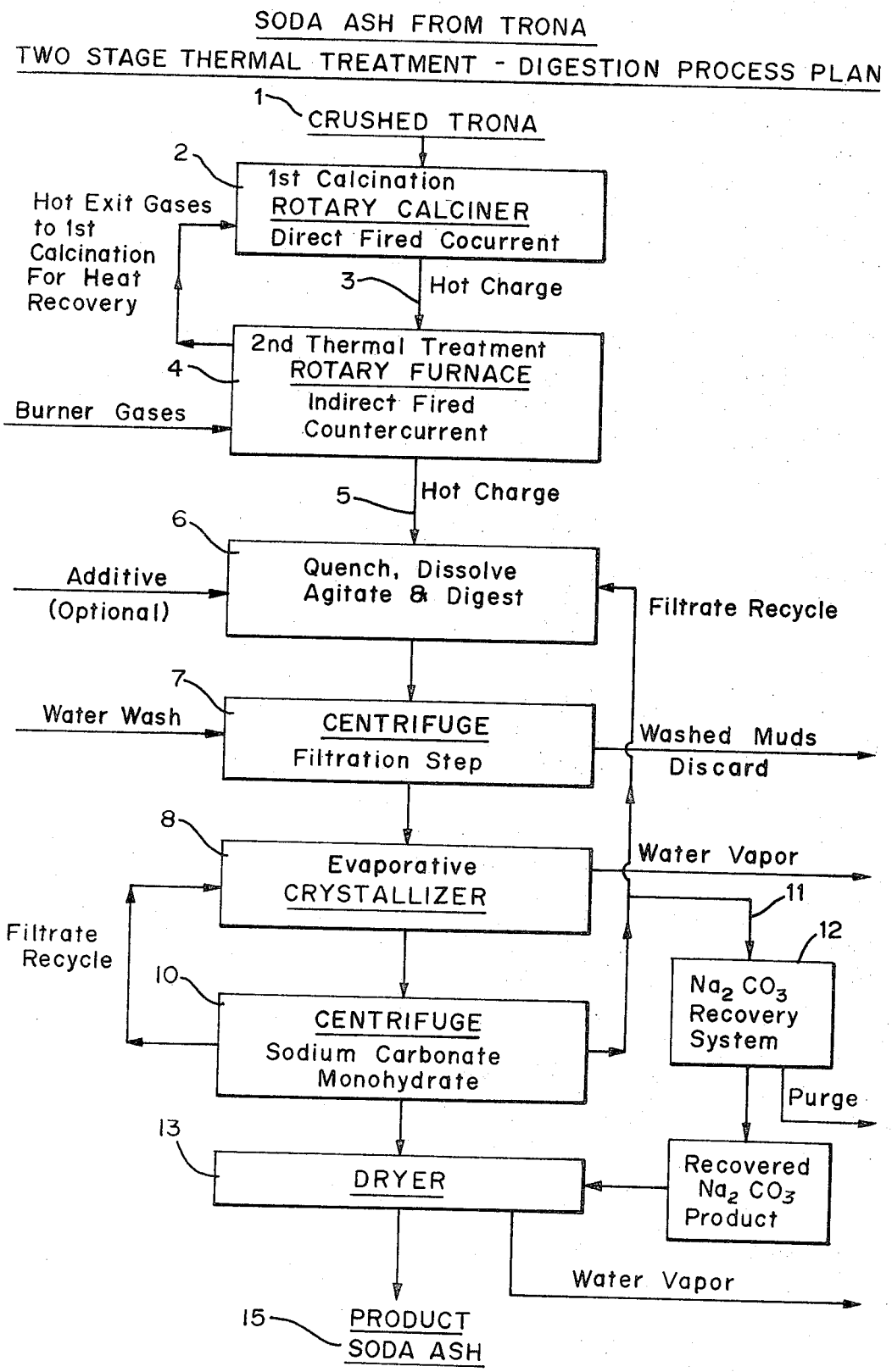

---

3,838,189
TWO-STAGE PROCESS FOR PRODUCING SODA ASH FROM TRONA
Peter Sopchak, Liverpool, and Joel P. Guptill, Syracuse, N.Y., assignors to Allied Chemical Corporation, New York, N.Y.
Filed Sept. 13, 1972, Ser. No. 288,855
Int. Cl. C01d 7/00, 7/22, 7/30
U.S. Cl. 423—184                                                   4 Claims

ABSTRACT OF THE DISCLOSURE

Two step calcination process for preparing sodium carbonate from trona, comprising a low temperature calcination to convert the contained sesquicarbonate to sodium carbonate, followed by a high temperature roasting step of short duration to eliminate contained organic matter while minimizing solubilization of contained silica.

CROSS-REFERENCE TO RELATED APPLICATION

Co-filed U.S. patent application, "Purification of Sodium Carbonate," U.S. Ser. No. 289,032 filed Sept. 14, 1972.

BACKGROUND OF THE INVENTION

I. Field of the invention

Naturally occurring trona, consisting mainly of sodium sesquicarbonate ($Na_2CO_3 \cdot NaHCO_3 \cdot 2H_2O$), is found in Wyoming and other parts of the world. By calcining this material, crude soda ash (anhydrous sodium carbonate) is obtained.

Two major contaminants generally found in trona are water solube organic compounds and siliceous matter. The organic matter is troublesome, for if not removed, it not only contaminates soda ash produced from the trona, but adversely modifies the crystal structure of sodium carbonate monohydrate produced by crystallization from "decarbonized" trona liquors, providing the liquors still contain traces of carbonaceous material which has escaped the decarbonizing method employed.

The contaminating siliceous matter is predominantly insoluble in water, and therefore relatively innocuous were it not for the fact that one very effective method of removing the carbonaceous impurities, simultaneously solubilizes a portion of the contained silica. The method of the present invention is directed to the effective removal of contaminating carbonaceous material without effecting a substantial increase in the small quantity of water soluble silicates generally present.

II. Description of the prior art

A key operation associated with the manufacture of high quality soda ash from Wyoming trona involves the elimination of organic impurities which have a detrimental effect on the geometrical and physical properties of the final product. Two different methods for the removal of this organic matter are frequently employed. The first involves treatment of the trona process solution with activated carbon, while the second requires that the ore be exposed to elevated temperatures. The major drawback of the first approach is that not all of the critical organic habit modifiers respond or adsorb favorably and, therefore, remain in solution causing less than ideal crystals to form. The elevated temperature scheme, on the other hand, not only results in undesirable solubilization of silica by solid phase reaction with soda ash, but also involves operational difficulties due to fusion of the ore.

Decarbonization of trona at an elevated temperature is a most efficient method of removing the soluble organic impurity, but the elevated temperatures used cause an increase in the soluble silicate concentration in the solutions prepared from the decarbonized trona as described in U.S. Pat. 3,260,567. If trona is decarbonized at these elevated temperatures, it becomes particularly advantageous to remove the soluble silicate impurity and thereby produce a purer soda ash product from the decarbonized trona solutions.

SUMMARY OF THE INVENTION

A two stage thermal treatment—digestion process is disclosed for conversion of trona ore to sodium carbonate, and more particularly to a high quality dense soda ash.

It is well known to calcine trona ore at comparatively low tempteratures to provide a crude soda ash while solubilizing minimal amounts of the silica present, but carbon compounds remain which are crystal habit modifiers, causing poor crystal formation. They also carry through to the final product as undesirable contaminants. Costly activated carbon towers, regeneration and processing techniques are required to remove these carbon impurities.

It is also well known to calcine trona ore at high temperatures to completely oxidize and vaporize these carbon compounds, but in so doing, soluble silicates are formed as a result of heating the soda ash and silica together. These soluble silicates carry through to the final product.

It has now been found, surprisingly, that by first heating the trona at comparatively low temperatures to convert it to crude soda ash, and then heating it at high temperatures, the carbon compounds can be removed without appreciably increasing the quantity of soluble silicates in the heat treated product.

In the two step thermal procedure of this invention, the first step comprises first calcining the trona at temperatures ranging from 300 to 550° F., preferably from about 350 to 450° F. to convert the trona to crude sodium carbonate. The second step comprises roasting the calcined sodium carbonate at tempetratures ranging from 900 to 1100° F., preferably from 925 to 1000° F., for a period of less than 30 minutes, to remove substantially all carbonaceous contaminants and minimize the production of water soluble silicates in the calcined soda ash. Indirect heating with countercurrent flow is preferred in this latter step to avoid flame impingement and local overheating of the charge, which can lead to handling difficulties, fusion problems and silica solubilization as a result of the gas flow and temperature gradients (hot spots) characteristic of direct firing. Similar reasons dictate the use of a calcined trona feed in the second kiln, since this minimizes the heat load and avoids the internal $CO_2$ gas generation associated with trona decomposition. To maximize heat economy, the first thermal step can if desired, utilize direct contact with hot gases as with direct firing, and cocurrent flow. No serious silica solubilization or fusion occurs in this case because the higher

$$Na_2CO_3 \cdot SiO_2$$

reaction temperatures are not attained, particularly at the critical feed point, since trona is decomposing endothermically. Exit burner gases from the second step kiln may be utilized in supplying part of the heat requirements of the first calcining step, thus recovering heat values.

Using the two step thermal procedure of the present invention, a crude soda ash is obtained, essentially free of organic compounds, and generally having so little soluble silicate as to fall within permissible limits for its use in the production of a high quality sodium carbonate. If, however, it is desired to reduce the soluble silicate content still further, two related digestion processes, applicable to the aqueous solution of the calcined trona, or for that matter, to any aqueous solution of sodium carbonate containing minor amounts of water soluble silicates, may be employed.

The aqueous solution to be treated may be prepared by dissolving the roasted product in water, or (at least in part) in the aqueous liquors obtained from a sodium carbonate crystallization step, to produce a solution having a concentration between 20 and 35.5% sodium carbonate by weight and a minor amount of suspended solids. The solution is digested at a temperature within the range of about 160 and 240° F. to remove at least about 25% of the soluble silicates contained therein. The insoluble matter is separated from the solution, and sodium carbonate crystallized therefrom.

The digestion of the solution in the presence of the suspended insolubles present in the decarbonized trona renders a portion of the soluble silicates insoluble. The now-insoluble silica is removed with the other insoluble portion of the decarbonized trona, and sodium carbonate crystallized from the solution remaining.

The second method requires the addition of an aluminum-containing compound such as aluminum oxide, aluminum hydroxide, sodium aluminate or bauxite, or a magnesium-containing compound such as magnesium oxide, magnesium carbonate, or a mixture of any of these. These compounds render the soluble silicates insoluble. The amount to be added depends upon the quantity of soluble silicate to be insolubilized and the rate at which it is to be accomplished. Preferably, between 0.1 and 2.5% (based on the weight of the $Na_2CO_3$) is used. Although the quantity is not critical, an amount of additive equal to at least about three times the soluble silicate present in the solution as $SiO_2$, is generally very effective. Once insolubilized, the silicates may be removed by filtration or other standard methods, and sodium carbonate crystallized from the filtrate.

DESCRIPTION OF THE PREFERRED EMBODIMENT WITH REFERENCE TO THE DRAWING

The accompanying diagram illustrates one embodiment for carrying out the process of the present invention.

Crushed trona 1, is fed into rotary calciner 2, which can be direct fired at a relatively low temperature ranging from about 300° to 550° F., preferably from 350 to 450° F., to convert the sodium sesquicarbonate to sodium carbonate. The firing is preferably cocurrent. No serious silica solubilization occurs because the $Na_2CO_3.SiO_2$ reaction temperatures are not attained when operating within the preferred temperature range, particularly since the decomposition reaction of the sesquicarbonate is endothermic. Of course indirect heating may be applied if desired.

The crude soda ash 3, from the first calcination step is transferred to a kiln, preferably a rotary furnace 4, while still hot, to conserve heat. The heat treatment at this point is at a higher temperature than that used for the first heat treatment, now ranging from about 900 to 1100° F., preferably from 925 to 1000° F., and for a short duration, preferably for a period of less than 30 minutes. Furnacing for about 15 minutes is especially preferred. These conditions are sufficient to provide a product substantially free of carbonaceous matter, but without appreciable solubilization of the contained silica. To further reduce the tendency for solubilization of the silica, it is recommended that indirect heating be used, because impingement of the carbonate particles by flame, and the local overheating and hot spots characteristic of direct firing techniques, contribute appreciably to the solubilization of the contained silica.

As a measure of heat conservation, it is recommended that the hot off-gases from this furnace 4, be conducted to the first calciner 2, to reduce the fuel requirements at this point. In the further interests of heat conservation, it is recommended that the hot product 5 of the furnace be quenched in water and/or sodium carbonate liquors in dissolving vessel 6. This solution is preferably agitated to keep the insoluble matter suspended, and the whole adjusted to a temperature within the range of 160 to 240° F. preferably between 185 and 215° F., for a period of between about 0.5 and 8.0 hours.

We have shown the dissolving vessel 6 and digestion vessel to be one and the same, which is preferred. Separate vessels may be used, however, if desired.

The digestion step places a considerable portion of the soluble silicate in an insoluble form. If it is desired to hasten the removal of the soluble silicates, and to increase the effectiveness of their removal, a minor amount of an additive, preferably between 0.1 and 2.5% of the weight of the contained sodium carbonate may be introduced either prior to or during the digestion. Recommended additives for this purpose include aluminum-containing compounds such as aluminum oxide, aluminum hydroxide, sodium aluminate and bauxite; and magnesium-containing compounds such as magnesium oxide and magnesium carbonate. Soluble aluminum and magnesium salts such as nitrates, sulfates and chlorides are also effective. They behave as their hydroxides and carbonates, for in fact, they are precipitated as such by the alkaline solution. These soluble salts are not recommended, however, because of the acid radicals they introduce as contaminants.

Following the digestion, the solution is filtered through centrifuge 7. The muds are water washed and discarded. The filtrate passes to any conventional type of evaporative crystallizer 8. Water vapor is lost, and the crystals of sodium monohydrate are separated from the mother liquor in centrifuge 10. Part of the mother liquor is recycled to crystallizer 8, and part may be returned to the dissolving/digest vessel 6 as at least part of the aqueous medium serving as solvent for additional calcined trona. This use of the mother liquor is another feature of our invention, for when the calcined trona has been prepared by the two stage thermal treatment, dissolving this calcined trona in an aqueous solution containing mother liquor recycled from the centrifuge, results in a significant reduction in the quantity of soluble silicates.

Still another part of the mother liquor, a relatively small portion, may be purged at 11, the amount being chosen so as to maintain the amount of impurities in the system at an acceptable level. Alternately, this impure mother liquor may be sent to a $Na_2CO_3$ recovery system 12, as shown, for recrystallization. Crystals obtained here may be fed to the dryer 13, or recycled to any point in the process consistent with their degree of purity. The liquors from this system may be discarded.

The main crop of crystals from the crystallizer 8 go to dryer 13 where they are heated at temperatures above 212° F. to drive off water of crystallization and produce soda ash as product 15, such as high purity dense soda ash.

EXAMPLE 1

Trona, crushed to minus ¼" is continuously calcined in a direct, cocurrently fired, rotary calciner at temperatures ranging from 375 to 440° F. Samples are taken for analysis to determine the residence time required to convert substantially all the sesquicarbonate to sodium carbonate. Based on the results, a residence time of 35 minutes is employed. Samples are taken from the stream of hot carbonate leaving the calciner and analyzed. They are found to contain 385 parts per million (p.p.m.) of organic matter calculated as carbon, and 950 p.p.m. of soluble silicate as $SiO_2$.

The hot stream of calcined trona at a temperature of 435° F. is directed to a rotary furnace, indirectly fired, with the hot gases passing countercurrent to the flow of calcined trona. The temperature is maintained within the range of 925 to 980° F. for a period of 15 minutes. A sample of the hot sodium carbonate leaving the furnace is found to contain 1190 p.p.m. of soluble silicate as $SiO_2$ and 26 p.p.m. of organic matter as carbon. This hot carbonate leaves the rotary furnace at a temperature of 930° F., and is quenched in water in an amount sufficient to produce a 30% solution of sodium carbonate, said water having a temperature of 100° F. This solution containing a small amount of insoluble matter is maintained with agitation at a temperature of 203° F. for a period of 4 hours, then separated from the insoluble matter contained therein by filtration. An analysis of the solution indicates the presence of 200 p.p.m. of soluble silicate, corresponding to 666 p.p.m. on the basis of the sodium carbonate content of the solution.

It is apparent that the second high temperature treatment did not increase the quantity of contained soluble silicate substantially, the increase amounting to only about 20%. It is also apparent that the hot digestion step in the presence of suspended insoluble matter reduced the amount of soluble silicate from 1190 to 666 p.p.m., which is only 56% of the quantity present in the heat treated sodium carbonate before the digestion step.

In the case of Example 1, and those to follow, the soluble silicate is determined colorimetrically by comparison with the color produced by similarly treated prepared standards. This is accomplished by the reaction of the silicate with ammonium molybdate, producing a yellow colored complex, then by reduction with 1-amino-2-naphthol-4-sulfamic acid to produce the blue complex. Comparisons are made photometrically at 620 millimicrons using a Technicon Autoanalyzer, manufactured by the Technicon Instrument Corp. of Chauncey, N.Y.

Carbon is determined by adding $H_2SO_4$ to the sample and warming to drive off all $CO_2$, then adding a silver catalyst and sodium persulfate solution to oxidize the carbon compounds present to $CO_2$. This is absorbed in an alkaline solution, and the quantity absorbed determined by titration.

EXAMPLE 2

The same grade of trona as that used in Example 1, similarly crushed, is subjected to a single calcining operation at 925 to 1000° F. using direct high temperature firing. Fusion and dust handling problems are experienced. Neither a second heat treatment nor a digestion step is applied. Analysis of the calcined product indicates the presence of 2388 p.p.m. of soluble silicate and 30 p.p.m. of organic compounds calculated as carbon.

Comparison of Example 2 with Example 1 which was carried out employing an embodiment of the present invention, clearly demonstrates the advantage of the two stage heat treatment. In the case of Example 2, the amount of soluble silica produced is more than 100% greater than that obtained with the two stage heat treatment as exemplified in Example 1.

EXAMPLE 3

The hot product of the calcination of Example 2 is quenched in water at ambient temperature, in an amount sufficient to produce a 30% solution of sodium carbonate containing a minor amount of suspended insoluble matter. This is agitated for 4 hours while maintained at a temperature of 95° F. The solution is then filtered and analyzed. The solution contains 576 p.p.m. of soluble silicate, corresponding to 1920 p.p.m. of soluble silicate in the calcined sodium carbonate. This represents over 80% of the amount (2388 p.p.m.) present before the 95° F. digestion.

When compared to Example 1 wherein a digestion at 203° F. decreased the quantity of soluble silicate to 50% of its pre-digest value, it can be seen that a relatively high temperature for the digestion (203° F. as compared to 95° F.) has an important bearing on the effectiveness of the soluble silicate removal.

EXAMPLE 4

This example is identical to that of Example 2 in all respects except for the length of time during which the digestion is carried out. The solution is digested at 203° F. for 8 hours with agitation. The solution is then filtered as before, and the 30% solution analyzed. It is found to contain 169 p.p.m., corresponding with 563 p.p.m. of soluble silicate in the sodium carbonate. This is only 23.6% of the amount of soluble silicate present in the calcined trona before the digestion step, and demonstrates the importance not only of a relatively high (203° F.) digestion temperature, but of a relatively long digestion period.

At higher temperatures, which can be obtained in a closed vessel, with associated autogenous pressures, the effectiveness of the digestion can be increased, and/or the digestion period reduced.

EXAMPLE 5

490 Grams of the 2-stage, heat treated trona of Example 1, containing 1190 p.p.m. of soluble silicate as $SiO_2$ is dissolved in 1500 grams of a 10% $Na_2CO_3$ mother liquor obtained from the crystallization of sodium carbonate monohydrate according to the method of the present invention. This produces a 30% solution of sodium carbonate wherein the sodium carbonate contains 910 p.p.m. of soluble silicate as $SiO_2$. This solution is maintained at 203° F. with stirring for 6 hours. The insoluble matter is removed by filtration, and the solution is found to contain 85 p.p.m. of soluble silica as $SiO_2$, or 284 p.p.m. based on the contained sodium carbonate.

It is apparent that the digestion method of reducing the soluble silicate is effective when the trona is dissolved in recycled mother liquor from the $Na_2CO_3 \cdot H_2O$ crystallization.

EXAMPLE 6

Decarbonized trona having had the 2-stage heat treatment detailed in Example 1, is divided into five equal portions weighing 640 grams. Each portion is stirred into 1.5 liters of deionized water to provide 30% solutions. To each of these five solutions, the following additions are made:

1. No addition
2. 9.85 grams of 65% sodium aluminate solution (1% based on the sodium carbonate).
3. 6.4 grams of aluminum hydroxide, reagent.
4. 6.4 grams of powdered bauxite (naturally occurring).
5. 3.2 grams of magnesium oxide heavy.

All the solutions are maintained at 203° F. with agitation for a total of 6 hours. At the end of that period, the solutions are analyzed for soluble silica. The results, calculated on the basis of the sodium carbonate present, are tabulated below:

TABLE I

| Number | Additive | $SiO_2$ basis $Na_2CO_3$ (p.p.m.) Initially | After 6-hour digestion |
|---|---|---|---|
| 1 | None | 1,190 | 615 |
| 2 | Sodium aluminate | 1,190 | <10 |
| 3 | Aluminum hydroxide | 1,190 | <10 |
| 4 | Bauxite | 1,190 | 125 |
| 5 | Magnesium oxide | 1,190 | 320 |

It is apparent that digestion with these additives are considerably more effective in removing soluble silicate, then digestions without, even though without additives, the system is still surprisingly effective. In runs 2, 3 and 4, about 1% of the additive, based on the weight of the sodium carbonate, is employed. In the case of No. 5, however, only 0.5% magnesium oxide is used.

Various modifications and alterations will become apparent to those skilled in the art, without departing from the scope and spirit of the invention, and it should be understood that the latter is not limited to the aforementioned examples and discussion.

We claim:

1. A process for the production of sodium carbonate from trona comprising, first, calcining the trona at temperatures ranging from 300 to 550° F. to convert the trona to crude sodium carbonate, and then, roasting the calcined sodium carbonate at temperatures ranging from 900 to 1100° F. for a period of less than 30 minutes to remove substantially all carbonaceous contaminants and to minimize water soluble silicates in the calcined soda ash.

2. The process of claim 1 wherein the trona is first calcined at temperatures ranging from 350 to 450° F., and then roasted at temperatures ranging from 925 to 1000° F.

3. The process of claim 1 wherein the first calcination is carried out by direct contact with hot gases and the roasting step by indirect heating.

4. The process of claim 1 wherein the hot off-gases from the roasting step are utilized in supplying part of the heat requirements of the first calcining step.

References Cited

UNITED STATES PATENTS

| | | | |
|---|---|---|---|
| 1,992,532 | 2/1935 | Kuhnert | 423—422 |
| 1,964,161 | 6/1934 | Kuhnert | 423—184 |
| 3,479,134 | 11/1969 | Warzel | 423—427 |
| 3,131,996 | 5/1964 | Seglin et al. | 423—206 |
| 3,189,408 | 6/1965 | Miller | 423—421 |
| 3,482,934 | 12/1969 | DiBello et al. | 423—427 |
| 3,333,918 | 8/1967 | Gancy et al. | 423—426 |
| 2,143,069 | 1/1939 | Hill et al. | 423—184 |
| 1,860,781 | 5/1932 | Liebknecht | 423—326 X |
| 3,172,726 | 3/1965 | Burke et al. | 423—339 |

OSCAR R. VERTIZ, Primary Examiner

G. P. STRAUB, Assistant Examiner

U.S. Cl. X.R.

423—196, 206 T, 339, 421